United States Patent [19]

Maucher et al.

[11] Patent Number: 4,732,250

[45] Date of Patent: Mar. 22, 1988

[54] TORQUE TRANSMITTING AND TORSION DAMPING ASSEMBLY

[75] Inventors: Paul Maucher, Sasbach; Oswald Friedmann, Lichtenau; Wolfgang Reik, Bühl, all of Fed. Rep. of Germany

[73] Assignee: Luk Lamellen und Kupplungsbau GmbH, Bühl, Fed. Rep. of Germany

[21] Appl. No.: 852,299

[22] Filed: Apr. 15, 1986

Related U.S. Application Data

[63] Continuation-in-part of Ser. No. 670,485, Nov. 13, 1984, and Ser. No. 672,581, Nov. 16, 1984.

[30] Foreign Application Priority Data

| Nov. 10, 1983 | [DE] | Fed. Rep. of Germany | ....... 3340703 |
| Nov. 15, 1983 | [DE] | Fed. Rep. of Germany | ....... 3341443 |
| Dec. 2, 1983 | [DE] | Fed. Rep. of Germany | ....... 3343668 |
| Mar. 5, 1984 | [DE] | Fed. Rep. of Germany | ....... 3410953 |
| Mar. 5, 1984 | [DE] | Fed. Rep. of Germany | ....... 3410365 |
| Mar. 5, 1984 | [DE] | Fed. Rep. of Germany | ....... 3413323 |

[51] Int. Cl.$^4$ .......................... F16F 15/12; F16D 3/14
[52] U.S. Cl. ................. 192/70.17; 192/106.2; 192/110 B; 74/574; 464/68
[58] Field of Search ............... 192/106.1, 106.2, 70.17, 192/110 B; 74/572, 574; 464/68

[56] References Cited

U.S. PATENT DOCUMENTS

| 1,439,486 | 12/1922 | Schmidt | ................. 384/496 |
| 2,143,300 | 1/1939 | Cole | ................. 192/70.17 |
| 3,129,794 | 4/1964 | Altmann | ................. 192/0.076 |
| 4,002,043 | 1/1977 | Yoshida | ................. 464/67 |
| 4,638,684 | 1/1987 | Maucher | ................. 74/574 |

FOREIGN PATENT DOCUMENTS

| 800698 | 7/1936 | France | ................. 74/574 |
| 2548299 | 1/1985 | France | ................. 192/106.2 |

*Primary Examiner*—Rodney H. Bonck
*Assistant Examiner*—David A. Testardi
*Attorney, Agent, or Firm*—Peter K. Kontler

[57] ABSTRACT

A torque transmitting assembly which can be installed between the engine and the change-speed transmission of a motor vehicle has a first flywheel which is driven by the crankshaft of the engine and a second flywheel which is movable axially of the first flywheel and can drive the transmission through the medium of a friction clutch. A damper is installed between the two flywheels to transmit torque while permitting some angular movement of the flywheel relative to each other. At least one antifriction bearing is installed between the two flywheels with some freedom of axial movement between its races. The races are stressed axially relative to each other in one direction in the engaged condition and in the opposite direction in response to a change in the condition of the clutch. The second flywheel is permanently biased toward or away from the first flywheel, depending upon the type of the clutch, and the disengagement of the clutch results in axial movement of the second flywheel relative to the first flywheel with attendant reduction of friction between the two flywheels in the engaged condition of the clutch.

43 Claims, 7 Drawing Figures

TORQUE TRANSMITTING AND TORSION DAMPING ASSEMBLY

CROSS-REFERENCE TO RELATED CASES

This is a continuation-in-part of our copending patent applications Ser. Nos. 670,485 filed Nov. 13, 1984 for "Torque transmitting and torsion damping assembly", and 672,581 filed Nov. 16, 1984 for "Torque transmitting assembly".

Certain features of the torque transmitting and torsion damping assembly of the present invention are further disclosed in the commonly owned copending patent application Ser. No. 669,659 filed Nov. 8, 1984 by Paul Maucher for "Torsion damping assembly for use in motor vehicles" and in the commonly owned copending patent application Ser. No. 669,768 filed Nov. 8, 1984 by Wolfgang Reik for "Assembly for compensating for fluctuations of torque which is transmitted by an internal combustion engine".

BACKGROUND OF THE INVENTION

The present invention relates to torque transmitting and torsion damping assemblies, and more particularly to a torque transmitting and torsion damping assembly which can be utilized in motor vehicles, especially for the transmission of torque between the crankshaft of an internal combustion engine and the input element of a change-speed transmission, and which is or can be equipped with torsion damping means for taking up and counteracting the shocks which develop during transmission of torque in motor vehicles or the like. Still more particularly, the invention relates to improvements in torque transmitting assemblies of the type wherein two coaxial flywheels are angularly movable relative to each other within certain limits against the opposition of a damper which transmits torque between and yieldably opposes rotation of the two flywheels relative to each other, wherein one of the flywheels can receive torque from the engine and wherein the other flywheel can transmit torque to the transmission. Still more particularly, the invention relates to improvements in torque transmitting assemblies of the type wherein the other flywheel transmits or can transmit torque to the input element of the change-speed transmission in response to engagement of a clutch. Thus, by engaging or disengaging the clutch by way of a suitable actuating device, the operator of the motor vehicle can initiate or terminate the transmission of torque between the engine and the transmission.

It is already known to install an antifriction bearing between the two flywheels of the above outlined torque transmitting assembly. The mounting of the bearing is such that one race of the bearing is rigid with the one flywheel and the other race is rigid with the other flywheel. Such mounting of the bearing between the two flywheels is not entirely satisfactory for a number of reasons. First of all, and since the flywheels are normally confined to rotation relative to each other through a small or very small angle, the two races are invariably and necessarily confined to the same angular movement relative to each other. In other words, each and every angular position of one race relative to the other race is a function of the angular position of the one flywheel with reference to the other flywheel. This creates serious problems when the motor vehicle is operated under load and one of the flywheels performs angular movements relative to the other flywheel at a high or extremely high frequency but at a small or extremely small amplitude. As a rule, the amplitude is not in excess of, and is normally much less than, one degree. Consequently, the extent to which the spherical, roller-shaped, needle-like or otherwise configurated rolling elements between the two races can roll, spin or turn during such high-frequency, low-amplitude angular movement of one of the flywheels relative to the other flywheel and/or vice versa is extremely small. As a rule, each rolling element merely rolls back and forth along one and the same portion of each of the two races with the result that the wear upon such portions of the races, and upon the corresponding portions of the rolling elements, is much more pronounced than the wear upon the remaining portions of the races and rolling elements. Repeated rolling of each rolling element along one and the same portion of each of the two races entails localized overstressing of the material of the two races. In fact, the rolling elements are likely to form in the races recesses in the form of depressions in the respective tracks which leads to practically immediate or very rapid destruction of the races. Moreover, such repeated rolling of the rolling elements along relative small portions of the races entails cracking and/or chipping of the races as well as of the rolling elements with the same result, i.e., the bearing becomes useless and must be replaced. A further serious drawback of the aforementioned repeated and frequent rolling of each spherical or otherwise configurated rolling element through a small or extremely small angle and along one and the same portion of each of the two races affects the quality of the lubricating action, i.e., the rolling elements are unable to adequately spread the lubricant along the tracks of the two races.

A torque transmitting assembly with a damper between the flywheels is disclosed, for example, in German Offenlegungsschrift No. 28 26 274. The assembly of this German printed publication employs a first flywheel which is driven by the crankshaft of the engine and has an axially extending central protuberance for a sleeve which is surrounded by the other flywheel. The sleeve has a radial flange which is disposed between the two flywheels and takes up the force that develops during engagement of the friction clutch. Such force is transmitted to the flywheel which receives torque from the crankshaft of the engine. Thus, the force with which the radial flange of the sleeve between the two flywheels is compressed increases drastically when the clutch is being engaged and the flange then generates a very pronounced moment of friction which is effective between the two flywheels. In many instances, a pronounced moment of friction during certain stages of operation of the clutch is not only unnecessary but acutally highly undesirable because it adversely influences the operation of the damper between the two frictional wheels. The adverse influence of excessive friction between the two flywheels is especially pronounced during actual engagement or disengagement of the clutch, particularly a friction clutch. Thus, the engine continues to remain in torque-transmitting engagement with the input element of the change-speed transmission during a substantial part of movement of the release element (such as a bearing) from the one to the other of its end positions. If the friction clutch employs a diaphragm spring with radially inwardly extending prongs which are acted upon by the release bearing, the two flywheels remain locked to each other (as a result of pronounced compression of the aforementioned radial flange) during the major part of axial movement of the tips of the prongs from the positions which they assume when the clutch is disengaged to the positions they assume in engaged condition of the clutch or vice versa. This enables the engine to transmit to the transmission vibrations of very high amplitude or vice versa which not only results in excessive stressing of the power train between the engine and the wheels or other driven parts but also affects the comfort of the occupant or occupants of the vehicle. The discomfort is caused by the generation of excessive noise and/or by excessive vibrations.

U.S. Pat. No. 4,351,167 to Hanke et al. discloses an elastic disc-type coupling wherein a single flywheel confines a disc and defines two chambers with a flow restrictor between the chambers. The tendency of the flywheel and of the disc to turn relative to each other is opposed by the liquid which is confined in the chambers. The patent does not propose to use antifriction bearings between the disc and the single flywheel.

A twin-flywheel firction clutch is disclosed in U.S. Pat. No. 4,274,524 to Nakane. This patentee proposes to employ a bushing which surrounds an axially extending protuberances of one of the flywheels and is surrounded by a plate driven by the other flywheel. The two flywheels have some freedom of angular movement relative to each other.

OBJECTS AND SUMMARY OF THE INVENTION

An object of the invention is to provide a novel and improved torque transmitting assembly wherein the bearing or bearings between the flywheels can stand much longer periods of use than in heretofore known assemblies.

Another object of the invention is to provide a torque transmitting and torsion damping assembly wherein the bearing or bearings between the flywheels can be properly lubricated irrespective of the extent and frequency of angular movement of the flywheels relative to each other.

A further object of the invention is to provide novel and improved means for rotatably mounting the flywheels of the above outlined torque transmitting assembly.

An additional object of the invention is to provide the torque transmitting assembly with novel and improved means for controlling and limiting the movements of the flywheels relative to each other.

Still another object of the invention is to provide a novel and improved method of prolonging the useful life of the bearing or bearings between the flywheels of the above outlined torque transmitting assembly.

An additional object of the invention is to provide novel and improved flywheels for use in the torque transmitting assembly.

A further object of the invention is to provide a torque transmitting assembly wherein the clutch such as a friction clutch, can perform the same function or functions as in conventional assemblies as well as additional important, beneficial and desirable functions.

Another object of the invention is to provide a motor vehicle which embodies the above outlined torque transmitting assembly.

An additional object of the invention is to provide a torque transmitting assembly which can be installed in motor vehicles as a superior substitute for heretofore known torque transmitting torsion damping assemblies.

A further object of the invention is to provide a torque transmitting assembly which is constructed and assembled in such a way that the engagement and/or disengagement of the clutch between one of the flywheels and the change-speed transmission does not entail the generation of excessive noise and/or pronounced vibrations and does not result in any damage to the power train between the engine and the driven parts.

Another object of the invention is to provide an assembly whose versatility exceeds that of heretofore known assemblies.

A further object of the invention is to provide a torque transmitting assembly whose operation can be caused to conform to the requirements in a specific vehicle in a surprisingly simple and efficient way.

A further object of the invention is to provide the assembly with novel and improved means for influencing the function of the damper between the flywheels when the clutch is in the process of being actuated to initiate or terminate the transmission of torque to the input element of the change-speed transmission.

Still another object of the invention is to provide a novel and improved method of regulating the damper between the flywheels of a torque transmitting assembly.

An additional object of the invention is to provide a torque transmitting assembly which can employ any one of several types of clutches, particularly friction clutches.

One feature of the invention resides in the provision of a torque transmitting and torsion damping assembly which can be used with particular advantage for the transmission of torque between the internal combustion engine and the input element of the change-speed transmission in a motor vehicle. The assembly comprises a first rotary unit which normally receives torque from the engine and a second rotary unit which is coaxial with the first unit and serves to normally transmit torque to the input element of the transmission. The first and second units respectively comprise first and second flywheels and the second unit further comprises a clutch (particularly a friction clutch) which is interposed between the second flywheel and the change-speed transmission. The assembly further comprises actuating means which is operable to change the condition of the clutch between an engaged condition in which the clutch transmits torque between the second flywheel and the transmission and a disengaged condition, antifriction bearing means interposed between the two flywheels which are angularly movable relative to each other and at least one of which is movable within limits axially relative to the other in response to operation of the actuating means, damper means which is disposed between the two units to yieldably oppose angular movements of the flywheels relative to each other, and resilient means acting axially of the flywheels and serving to yieldably resist axial movements of the one flywheel relative to the other flywheel in response to operation of the actuating means. The resilient means can be designed to yieldably resist axial movements of the second flywheel in response to operation of the actuating means to disengage the clutch. The operation of the actuating means involves the application of a predetermined force, and the force with which the resilient means yieldably resists axial movements of the one flywheel is or can be smaller than the predetermined force.

The bearing means can comprise first and second races which are respectively rotable with the first and second flywheels, and the resilient means can include a resilient element (e.g., a diaphragm spring) which reacts against one of the units and bears against the other unit so as to resist axial movements of the two races relative to each other in one direction in the engaged condition of the friction clutch.

The one flywheel can move axially toward the other flywheel in response to operation of the actuating means to disengage the clutch. The clutch is then a push-type clutch. The clutch is a so-called pull-type clutch if the one flywheel moves axially away from the other flywheel in response to operation of the actuating means to disengage the clutch.

The resilient means can include means (such as the aforementioned diaphragm spring) for biasing the one flywheel axially toward the other flywheel, or such resilient means can include means for biasing the one flywheel axially and away from the other flywheel. Means is preferably provided for limiting the extent to which the one flywheel is movable axially relative to the other flywheel.

The bearing means can comprise a first race which is installed in and is held against axial movement relative to the second flywheel, and a second race which is axially movably mounted on the first flywheel, preferably on a centrally located protuberance of the first flywheel. The bearing means can comprise a ball bearing, e.g., a bearing with a single annulus of antifriction rolling elements.

Another feature of the invention resides in the provision of a torque transmitting and torsion damping assembly which is particularly suited for the transmission of torque between the internal combustion engine and the input element of the change-speed transmission in a motor vehicle. The assembly comprises a first rotary unit which normally receives torque from the engine and a second rotary unit which is coaxial with the first unit and serves to normally transmit torque to the input element of the transmission. The first and second units respectively comprise first and second flywheels, and the second unit further comprises a clutch which is interposed between the second flywheel and the transmission. At least one of the flywheels is movable within limits axially relative to the other flywheel, and the flywheels are angularly movable relative to each other. The assembly further comprises antifriction bearing means between the flywheels, damper means which is interposed between the two units to oppose angular movements of the flywheels relative to each other, and actuating means which is operable to change the condition of the clutch between an engaged condition in which the clutch transmits torque between the second flywheel and the input element of the transmission and a disengaged condition. The one flywheel is arranged to move axially relative to the other flywheel in response to operation of the actuating means. The flywheels can constitute or resemble discs. The arrangement may be such that the one flywheel respectively moves axially toward and away from the other flywheel in response to disengagement and engagement of the clutch or in response to engagement and disengagement of the clutch. The latter can constitute a push-type or a pull-type friction clutch.

The assembly preferably further comprises means for biasing the one flywheel axially with reference to the other flywheel, either toward or away from the other flywheel, and such biasing means can comprise one or more diaphragm springs. Means is provided to limit the extent of axial movability of the one flywheel relative to the other flywheel.

The damper means can comprise at least one friction generating element which is interposed between the two flywheels and serves to generate friction whose magnitude varies in response to the operation of the actuating means. The magnitude of friction which is generated by the friction generating means is preferably variable in response to axial movement of the one flywheel relative to the other flywheel. The magnitude of friction which is generated by the friction generating means can be reduced (e.g., all the way to zero) in response to operation of the actuating means in a sense to disengage the friction clutch. The friction generating element can comprise a washer which is disposed between the two flywheels, either directly or between two parts which rotate with the flywheels. If the flywheels are coaxial discs having confronting surfaces, the friction generating element can be interposed between the two confronting surfaces. The biasing means which isprovided to urge the one flywheel axially toward or away from the other flywheel in engaged condition of the clutch can include means for urging the friction generating element into engagement with the two flywheels in the engaged condition of the clutch. Such urging means is preferably inoperative when the clutch is disengaged. The one flywheel can be designed to reduce the bias of the biasing means upon the friction generating element in response to axial movement of the one flywheel relative to the other flywheel as a result of operation of the actuating means to disengage the clutch.

Bearing means is preferably interposed between the two flywheels, and such bearing means preferably comprises at least one antifriction ball, roller or like bearing having a first race which is mounted in the one flywheel for axial movement with the latter and a second race which is mounted in and is movable axially of the other flywheel. As a rule, or at least in accordance with a presently preferred embodiment of the invention, the first race is mounted in the second flywheel. The aforementioned biasing means can be designed to bias the one flywheel axially relative to the other flywheel through the medium of the second race. Such biasing means can comprise a diaphragm spring or the like which opposes rotation of the second race with reference to the other flywheel.

The damper means can comprise energy storing resilient means in the form of one or more coil springs acting in the circumferential direction of the two units and/or additional friction generating means which is interposed between the two units. Such additional friction generating means may but need not be designed to change the friction between the two units in response to operation of the actuating means, i.e., in response to axial movement of theone flywheel relative to the other flywheel.

The novel features which are considered as characteristic of the invention are set forth in particular in the appended claims. The improved torque transmitting assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
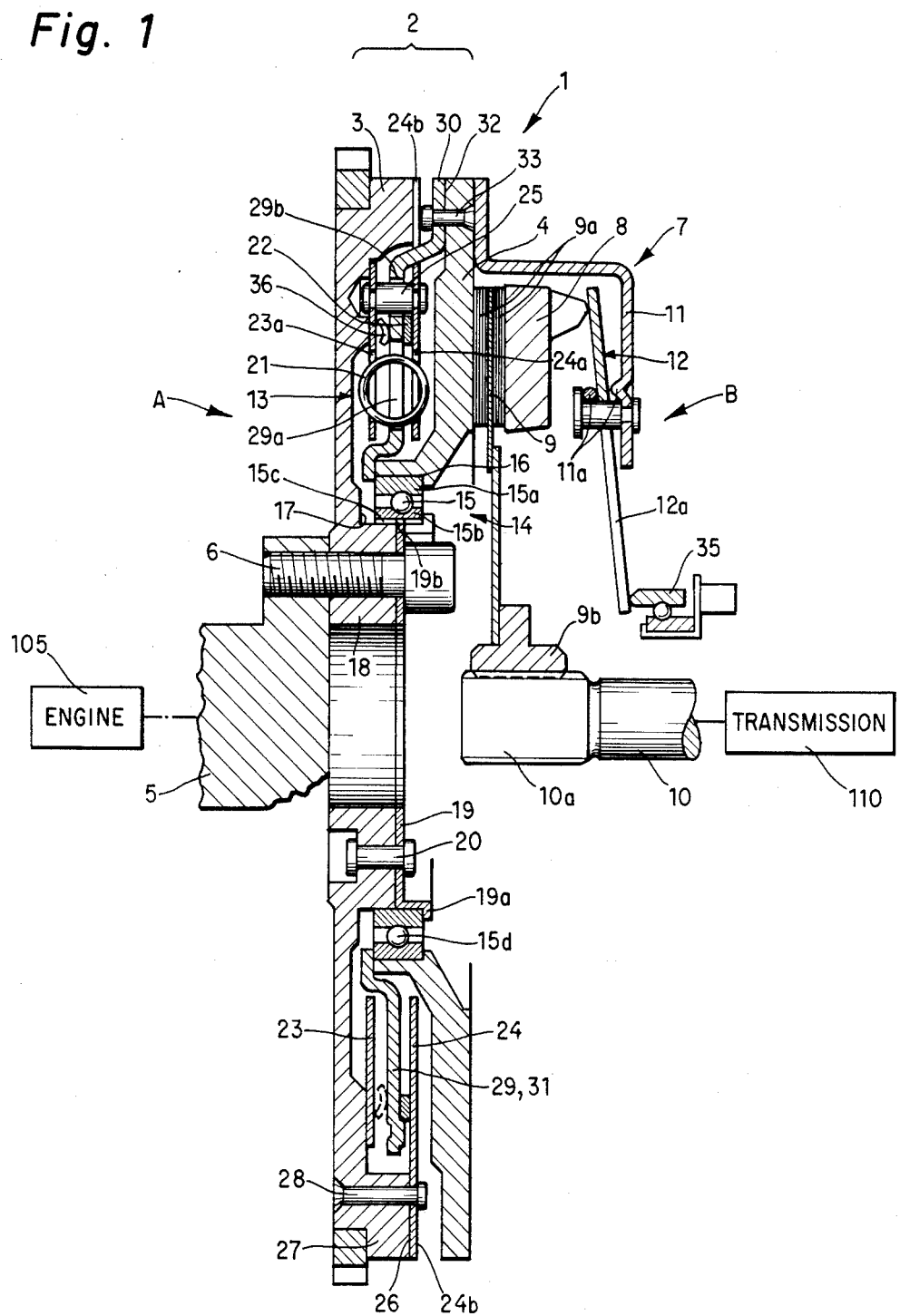
FIG. 1 is a fragmentary axial sectional view of a torque transmitting and torsion damping assembly which embodies one form of the invention and employs a push-type clutch.

Referring first to FIG. 1, there is shown a torque transmitting assembly 1 which is installed between an internal combustion engine 105 and a change-speed transmission 110. The assembly 1 comprises a first rotary unit A and a coaxial second rotary unit B. The unit A includes the crankshaft 5 of the engine 105 and a first flywheel 3 which is non-rotatably secured to the crankshaft 5 by an annulus of bolts 6 or other suitable fasteners. The unit B comprises a second flywheel 4 which is coaxial with and is angularly movable relative to the flywheel 3, and a friction clutch 7 which is interposed between the flywheel 4 and the input element 10 of the transmission 110. The flywheels 3 and 4 together constitute a composite flywheel 2 of the improved torque transmitting assembly 1.

The friction clutch 7 is of the so-called push type and comprises a housing or cover 11 which is non-rotatably secured to the flywheel 4 by a set of screws, bolts or other suitable fasteners (not shown). The cover 11 carries two concentric ring-shaped seats 11a for an intermediate portion of a diaphragm spring 12 which is tiltable between the two seats and whose outer marginal portion bears against the adjacent axially extending projections of a pressure plate 8 (non-rotatably but axially movably coupled to the cover 11 by a set of leaf springs, not shown) when the clutch 7 is engaged. The pressure plate 8 then bears against the adjacent lining 9a of the clutch disc 9 whose hub 9b has internal splines for axially parallel external teeth on a portion 10a of the input element 10. The other lining 9a of the clutch disc 9 then bears against the adjacent surface of the flywheel 4 so that the disc 9 transmits torque to the input element 10 of the transmission 110 as long as the clutch 7 is engaged and whenever the engine 105 drives the flywheel 3. A damper 13 is installed between the units A and B of the assembly 1 to yieldably oppose angular movements of the flywheels relative to each other and to transmit torque between the flywheel 3 and the flywheel 4, e.g., when the flywheel 3 receives torque from the crankshaft 5. The reference character 35 denotes the bearing of an actuating device which can be operated to engage or disengage the friction clutch 7. The clutch is engaged when the bearing 35 of the actuating device assumes the axial position of FIG. 1. In order to disengage the clutch 7, the actuating device is operated in the customary way so as to push the radially inwardly extending prongs 12a of the diaphragm spring 12 in a direction to the left, as viewed in FIG. 1, so that the diaphragm spring is caused to tilt between the seats 11a and moves its outer marginal portion axially and away from the flywheel 4. This relaxes the pressure upon the pressure plate 8 so that the latter ceases to urge the left-hand lining 9a against the flywheel 4 with the result that the clutch disc 9 ceases to transmit torque to, or receive torque from, the input element 10 of the change-speed transmission 110.

The assembly 1 further comprises an antifriction bearing system 14 which, in the embodiment of FIG. 1, comprises a single antifriction ball bearing 15 having an inner race 15b, an outer race 15a and a single annulus of spherical rolling elements 15d between the two races. The outer race 15a of the bearing 15 is non-rotatably received in a centrally located opening 16 of the flywheel 4 in such a way that the latter cannot move axially relative to the race 15a and vice versa. The inner race 15b of the bearing 15 surrounds a centrally located protuberance 18 of the flywheel 3 and is adjacent to a radially extending shoulder 17 at the left-hand axial end of the protuberance 18. A retainer 19 which is made of sheet metal or the like is provided with a profiled radially outermost annular portion 19a serving to limit the extent of axial movement of the inner race 15b with reference to the protuberance 18. Rivets 20 (only one shown in FIG. 1) are provided to secure the retainer 19 to the protuberance 18 of the flywheel 3.

The damper 13 comprises several energy storing elements 21 in the form of coil springs (only one can be seen in FIG. 1) and a friction generating device 22 in the form of a friction ring which damps the movements of the coil springs 21 when the flywheel 4 is caused to perform angular movements relative to the flywheel 3 and/or vice versa.

The input component of the damper 13 comprises two discs 23 and 24 which are spacedly secured to each other and to the flywheel 3 by a set of rivets 25 or other suitable distancing elements. The disc 24 has radially outwardly extending arms 24b which abut against the adjacent surface 26 of the flywheel 3 and are affixed to the latter by a set of rivets 28 (one shown in the lower part of FIG. 1). The surface 26 is provided on a rim 27 of the flywheel 3. The discs 23 and 24 flank a flange 29 which constitutes the output component of the damper 13 and shares all angular movements of the flywheel 4. The radially outermost portion of the flange 29 has a set of equidistant arms 30 which alternate with the arms 24b of the disc 24, as considered in the circumferential direction of the rim 27, and are adjacent to the surface 32 of the flywheel 4. The arms 30 are secured to the flywheel 4 by rivets 33 or analogous fasteners one of which is shown in the upper portion of FIG. 1. The central portion 31 of the flange 29 is axially offset with reference to the arms 30 and is located between the discs 23 and 24.

The central portion 31 of the flange 29 is formed with a set of windows 29a, one for each of the coil springs 21, and the discs 23, 24 are respectively formed with windows 23a, 24a, one for each window 29a. The dimensions of the windows 29a and of the adjacent windows 23a, 24a as well as the dimensions and other characteristics of the coil springs 21 are selected in such a way that the damper 13 offers a multi-stage resistance to angular movements of the flywheel 4 relative to the flywheel 3 and/or vice versa. Thus, the characteristic curve of the damper 13 is a stepped curve because the resistance which the damper offers to initial angular movement of the flywheels 3, 4 relative to each other from a starting or neutral position can deviate from the resistance which is offered to one or more advanced stages of such angular movement.

The flange 29 is formed with arcuate cutouts or slots 29b for the central or median portions of the respective distancing elements 25, i.e., the elements 25 and the surfaces surrounding the ends of the respective slots 29b limit the extent of angular movement of the flywheels 3 and 4 relative to each other.

When the friction clutch 7 is engaged, the friction generating ring 22 of the damper 13 bears against the disc 24. The ring 22 is or can be non-rotatably secured to the right-hand side of the flange 29 radially inwardly of the distancing elements 25.

In order to enable the flywheel 4 to move, within limits, axially relative to the flywheel 3, the inner race 15b of the bearing 15 is movable axially of the protuberance 18 on the flywheel 3 between a right-hand end position which is determined by the radially outermost annular portion 19a of the retainer 19 and a left-hand end position which is determined by the shoulder 17. The race 15b is held against rotation relative to the protuberance 18 by a radially outwardly extending projection or key 19b of the retainer 19; such projection extends into an axially parallel groove 15c which is machined into the internal surface of the inner race 15b. When the friction generating ring 22 is intact (i.e., when the wear upon this friction generating ring is nil or negligible, the inner race 15b is preferably spaced apart from the annular portion 19a of the retainer 19 in the engaged condition of the clutch 7. This ensures that the assembly 1 can compensate for wear upon the ring 22 by holding the inner race 15b closer to the annular portion 19a. Such clearance between the annular portion 19a and inner race 15b can also compensate for machining tolerances.

The assembly 1 further comprises a resilient element in the form of a diaphragm spring 36 which is installed between the flywheels 3 and 4. More specifically, the diaphragm spring 36 is installed between the disc 23 and the central portion 31 of the flange 29. The diaphragm spring 36 can yield in the axial direction of the units A and B. In the embodiment of FIG. 1, the diaphragm spring 36 is installed between the parts 31 and 23 opposite the friction ring 22. The radially innermost portion of the diaphragm spring 36 reacts against the portion 31 of the flange 29 and its radially outermost portion bears against the adjacent side of the disc 23. The purpose of the diaphragm spring 36 is to urge the flywheel 4 axially and away from the flywheel 3, i.e., to indirectly urge the inner race 15b of the antifriction bearing 15 toward the annular portion 19a of the retainer 19.

The operation of the torque transmitting assembly 1 is as follows:

It is assumed that the parts of the torque transmitting assembly assume the positions which are shown in FIG. 1, i.e., the friction clutch 7 is engaged and is ready to transmit torque to the input element 10 of the change-speed transmission 110 as soon as the engine 105 is started to rotate the crankshaft 5 and the flywheel 3.

The ring 22 generates a moment of friction which reaches a maximum value as soon as the clutch 7 is engaged because the diaphragm spring 36 is then free to urge the median portion 31 of the flange 29 in a direction to the right, as viewed in FIG. 1, so that the ring 22 bears against the disc 24 with a maximum force.

If the driver of the motor vehicle then decides to operate the actuating device for the friction clutch 7 by causing the bearing 35 of the actuating device to move in a direction to the left, as viewed in FIG. 1, the outer race of the bearing 35 applies pressure to the tips of the prongs 12a of the diaphragm spring 12 whereby the latter is tilted between the seats 11a of the cover 11 and this causes the cover 11 to urge the flywheel 4 in a direction toward the flywheel 3. Consequently, the bearing 35 causes the diaphragm spring 12 of the friction clutch 7 to oppose the action of the diaphragm spring 36 with a progressively increasing force, i.e., the moment of friction which is generated by the ring 22 decreases in response to operation of the actuating device including the bearing 35. When the force which is applied to operate the actuating device for the friction clutch 7 reaches a certain value, the bias of the diaphragm spring 36 is overcome, i.e., the spring 36 is tilted and allows the flywheel 4 to move axially toward and closer to the flywheel 3. The friction generating ring 22 is disengaged from the disc 24, i.e., friction between the ring 22 and the disc 24 is reduced to zero.

Axial shifting of the flywheel 4 in a direction toward the flywheel 3 entails an axial movement of the entire bearing 15 in the same direction whereby the inner race 15b slides along the projection 19b of the retainer 19 and moves toward the shoulder 17 at the left-hand axial end of the protuberance 18 on the flywheel 3. The bearing 15 is then biased axially in the opposite direction. This bearing must take up the force which is required to operate the clutch actuating device, i.e., to disengage the clutch 7 in order to terminate the transmission of torque between the flywheel 4 and the input element 10 of the change-speed transmission 110.

In order to reengage the friction clutch 7, the force acting upon the bearing 35 of the clutch actuating device is gradually reduced whereby the diaphragm spring 12 of the friction clutch is caused to tilt between its seats 11a (this spring is installed in prestressed condition and tends to assume the position which is shown in FIG. 1) and moves the pressure plate 8 in a direction toward the flywheel 4, i.e., the linings 9a of the clutch disc 9 are gradually clamped between the flywheel 4 and the pressure plate 8. When the force acting upon the bearing 35 is reduced to a certain value which is less than the force of the diaphragm spring 36, the flywheel 4 and the bearing 15 are caused to move axially away from the flywheel 3 whereby the race 15b slides along the projection 19b of the retainer 19 and advances toward the annular portion 19a. Thus, the friction ring 22 is free to reengage the disc 24 and to resist the angular movements of the flywheels 3, 4 relative to each other in conjunction with the coil springs 21 of the damper 13.

When the diaphragm spring 36 is free to maintain the flywheel 4 in the axial position of FIG. 1, the inner race 15b is held in proper axial position relative to the outer race 15a by the rolling elements 15d between the two races. The same holds true when the clutch 7 is disengaged, i.e., when the diaphragm spring 36 is deformed and the inner race 15b is located to the left of the position which is shown in FIG. 1.

An important advantage of the improved torque transmitting and torsion damping assembly 1 is that the diaphragm spring 36 continuously stresses the antifriction bearing 15 when the clutch 7 is engaged. Thus, the spring 36 urges the outer race 15a axially of the flywheels 3, 4 in a direction to the right, as viewed in FIG. 1, and thereby tends to move the race 15a relative to the race 15b. The bearing 15 acts not unlike a thrust bearing in that the rolling elements 15d hold the races 15a, 15b against axial movement relative to each other. When the clutch 7 is in the process of being disengaged, the outer race 15a can move axially of the inner race 15b, at least to an extent which is determined by the play between the two races and against the resistance of the diaphragm spring 36. This alters the points of contact between the rolling elements 15d and the tracks which are defined for such rolling elements by the races 15a and 15b. Such changes in the points of contact are desirable and advantageous because they reduce the likelihood of permanent contact of rolling elements 15d with identical portions of the tracks in the races 15a and 15b so that the useful life of the bearing 15 is much longer than in heretofore known assemblies. Moreover, the rolling elements 15d ensure more satisfactory lubrication of the tracks of the races 15a and 15b. Still further, the rolling elements 15d are compelled to roll through greater angles so that they move back and forth along longer portions of the races 15a and 15b with the aforementioned advantages as concerns the useful life of the bearing 15. The feature that the races 15a, 15b are compelled to share the angular movements of the respective flywheels 4 and 3 also contributes to more uniform wear upon the bearing 15 because the elements 15d are compelled to roll through greater angles. The useful life of the bearing 15 is also prolonged due to the fact that the races 15a, 15b are axially stressed relative to each other in one axial direction of the flywheels 3, 4 when the clutch 7 is engaged and in the opposite direction (counter to the one direction) when the clutch 7 is disengaged.

Figure 2:
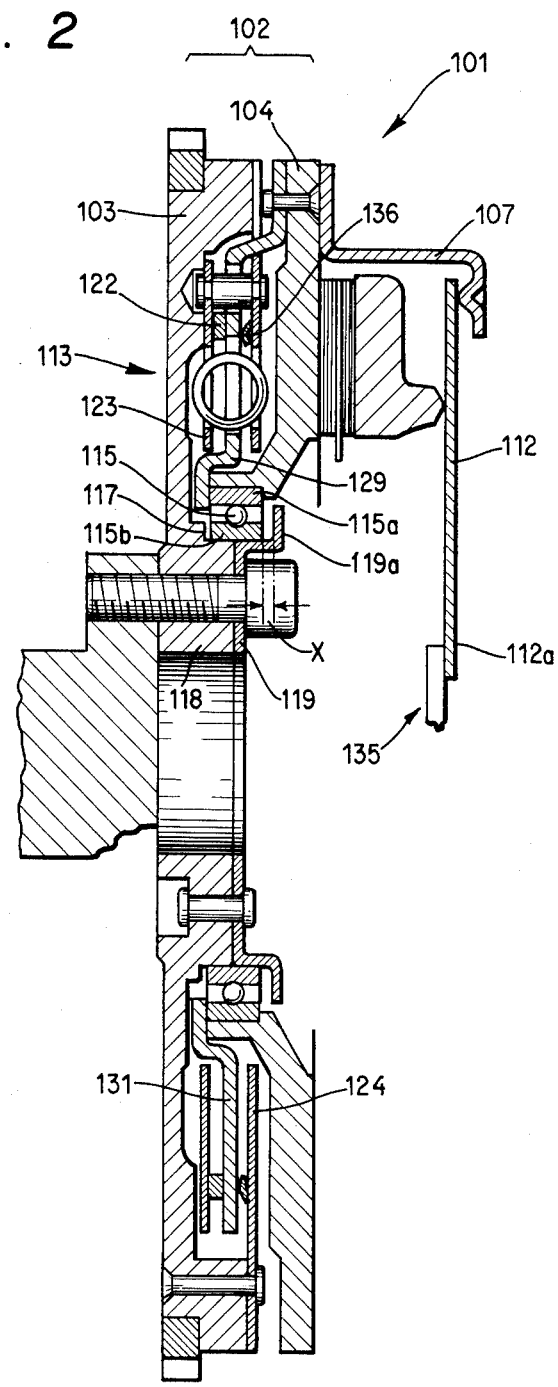
FIG. 2 is a fragmentary axial sectional view of a torque transmitting and torsion damping assembly which embodies another form of the invention and employs a pull-type clutch.

The torque transmitting assembly 101 of FIG. 2 differs from the assembly 1 of FIG. 1 in that the push-type clutch 7 is replaced with a so-called pull-type clutch 107. All such parts of the assembly 101 which are identical with or clearly analogous to the corresponding parts of the assembly 1 are denoted by similar reference characters plus 100. The friction generating ring 122 of the damper 113 is disposed at the left-hand side of the output component or flange 129 of the damper. The diaphragm spring 136 is shown in stressed condition, i.e., it biases the friction ring 122 (which is affixed to the flange 129) against the disc 123 with a maximum force. It will be noted that the diaphragm spring 136 urges the flywheel 104 and the bearing 115 in a direction to the left, i.e., axially of and toward the flywheel 103.

A small annular clearance is provided between the inner race 115b of the bearing 115 and the shoulder 117 of the flywheel 104 to enable the friction ring 122 to adequately engage the disc 123 even if the ring 122 has undergone a certain amount of water. The diaphragm spring 136 then simply maintains the flywheel 104 and the bearing 115 in a different axial position, namely nearer to the shoulder 117.

The diaphragm spring 136 is installed in such a way that it flattens out to a predetermined extent in response to the application of a force which exceeds the bias of this spring. The force is generated again as a result of operation of the actuating device 135 for the friction clutch 107, i.e., in response to the exertion of a pull upon the tips of prongs 112a of the diaphragm spring 112 so that the prongs 112a move in a direction to the right, as viewed in FIG. 2. When the diaphragm spring 136 is caused to yield so that the median portion 131 of the flange 129 moves nearer to the disc 124, the frictional engagement between the ring 122 and the disc 123 is reduced to zero i.e., the ring 122 is out of contact with the disc 123 when the clutch 107 is disengaged.

The operation of the assembly 101 of FIG. 2 is as follows:

The parts of the assembly 101 are assumed to be held in the illustrated positions, i.e., the friction clutch 107 is engaged and is ready to transmit torque between the flywheel 104 and the input element (not shown) of the change-speed transmission. Since the clutch 107 is engaged, the diaphragm spring 136 is free to bias the friction ring 122 with a maximum force so that the latter bears against the disc 123 and strongly opposes all angular movements of the flywheels 103, 104 relative to each other. When the driver of the motor vehicle decides to disengage the clutch 107, the actuating device 135 is operated to pull the tips of the prongs 112a on the diaphragm spring 112 of the friction clutch in a direction to the right, as viewed in FIG. 2, whereby the diaphragm spring 112 begins to counteract the bias of the diaphragm spring 136 so that the force with which the friction ring 122 opposes angular movements of the flywheels 103, 104 relative to each other decreases. The same holds true for the indirect axial stressing of the bearing 115 by the spring 136. When the force which the actuating device 135 applies to the prongs 112a exceeds the bias of the diaphragm spring 136, the latter is tilted (i.e., its axial length decreases) and the flywheel 103 moves axially of and away from the flywheel 104 through a distance which matches the extent of axial shortening of the diaphragm spring 136. This entails a complete disengagement of the friction generating ring 122 from the disc 123, i.e., the ring 122 ceases to offer resistance to angular movements of the flywheels 103, 104 relative to each other. The bearing 115 shares the axial movement of the flywheel 104 away from the flywheel 103 and is then stressed in the opposite direction.

If the user of the vehicle thereupon decides to reengage the friction clutch 107, the force which the actuating device 135 exerts to pull the prongs 112a in a direction to the right is relaxed. When the force which is applied by the actuating device 135 drops below the force of the diaphragm spring 136, the latter is free to dissipate some energy and to shift the flywheel 103 and the entire bearing 115 axially of and toward the flywheel 103 so that the friction generating ring 122 again bears against the disc 123 and opposes angular movements of the flywheels 103, 104 relative to each other with a maximum force. The bearing 115 is then stressed in the same way as during the preceding interval of engagement of the friction clutch 107.

Figure 3:
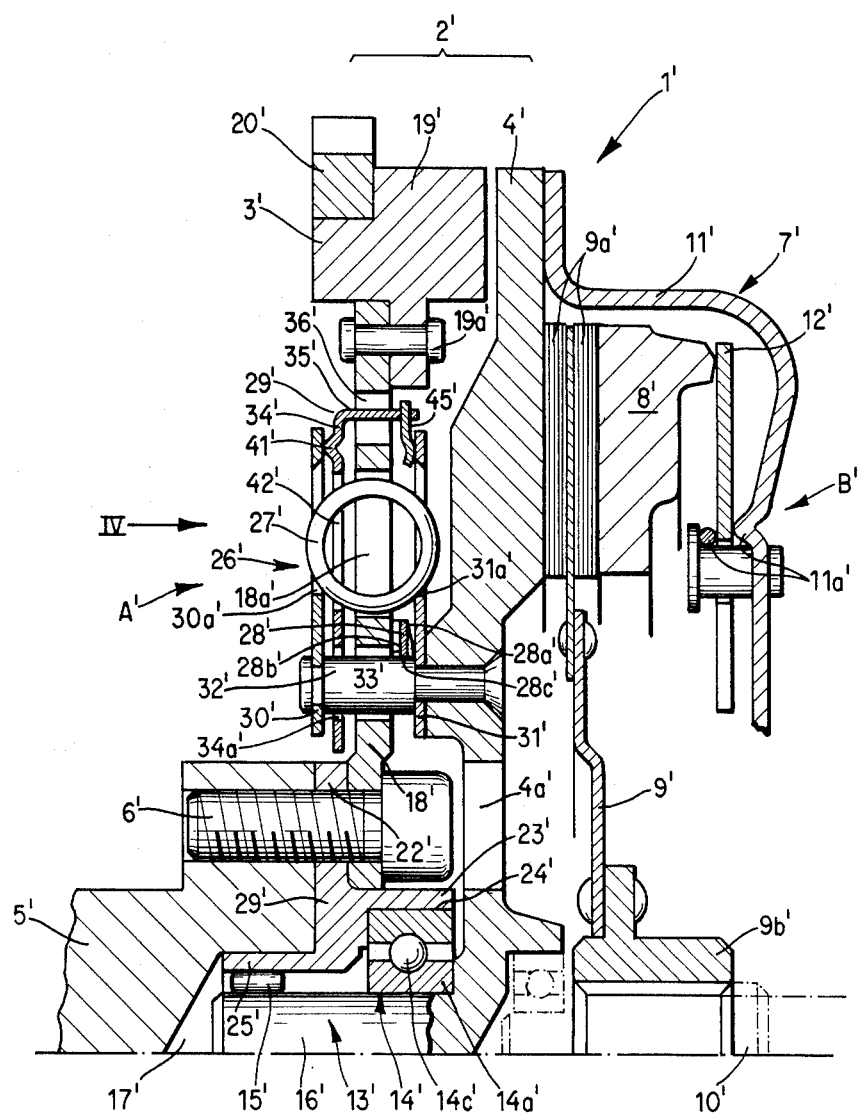
FIG. 3 is a fragmentary axial sectional view of a third assembly which also employs a push-type clutch.
Figure 4:
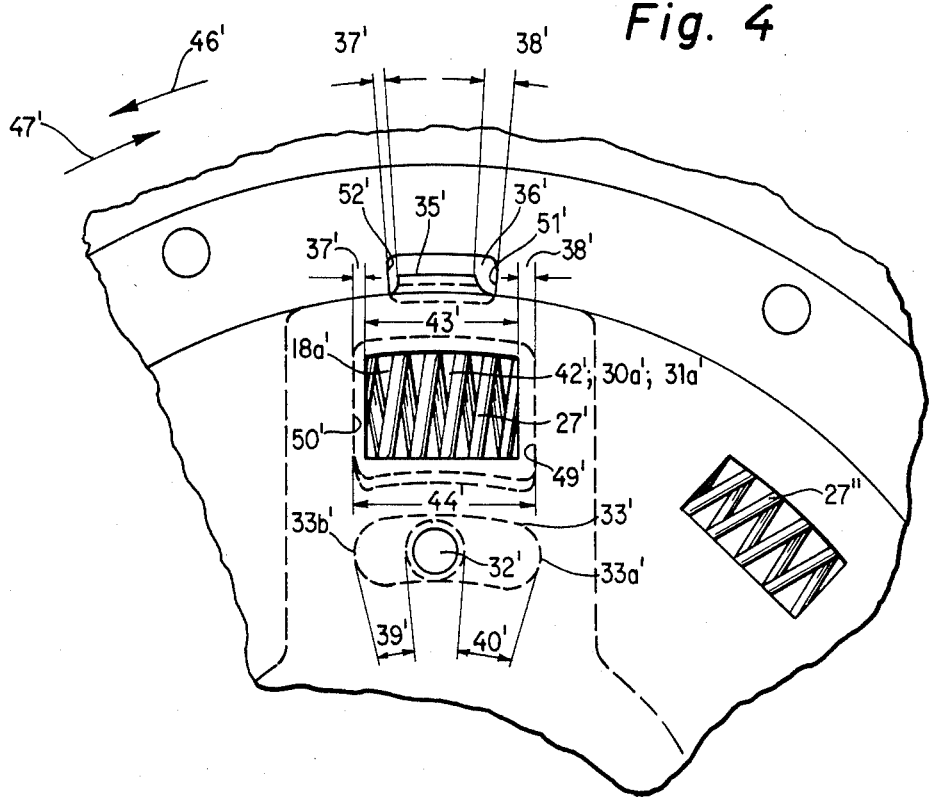
FIG. 4 is a fragmentary end elevational view as seen in the direction of arrow IV in FIG. 3.

FIGS. 3 and 4 show a third torque transmitting assembly 1' with two coaxial rotary units A', B'. The unit A' includes the crankshaft 5' of the internal combustion engine (not shown) and a first flywheel 3', and the unit B' comprises a second flywheel 4' as well as a push-type friction clutch 7'. The flywheels 3' and 4' together constitute a composite flywheel 2' and are movable angular with reference to each other. The flywheel 3' is affixed to the crankshaft 5' by a set of bolts 6' or other suitable fasteners.

The housing or cover 11' of the friction clutch 7' is riveted, bolted or otherwise securely attached to the flywheel 4' and carries two seats 11a' for an intermediate annular portion of a diaphragm spring 12' whose radially outermost portion bears against the adjacent axially extending projections of a pressure plate 8' when the clutch 7' is engaged. The friction linings 9a' of the clutch disc 9' are then clamped between the pressure plate 8' and the flywheel 4' so that the internally splined hub 9b' of the clutch disc 9' can transmit torque between the flywheel 4' and the input element 10' of the change-speed transmission (not shown). When the actuating device (not shown in FIG. 3 but corresponding to the actuating device whose bearing 35 is shown in FIG. 1) is operated to tilt the diaphragm spring 12' between its seats 11a' for the purpose of disengaging the clutch 7', the force with which the pressure plate 8' bears against the adjacent lining 9a' of the clutch disc 9' is relaxed and the flywheel 4' is then free to rotate relative to the clutch disc 9' and input element 10' of the transmission or vice versa.

A bearing system 13' is interposed between the flywheels 3' and 4'. In the embodiment of FIGS. 3 and 4, the bearing system 13' comprises a single antifriction ball bearing 14' and a single radially acting needle bearing 15'. The bearings 14' and 15' are spaced apart from one another, as considered in the axial direction of the flywheels 3' and 4'. The flywheel 4' has a centrally located cylindrical protuberance or stub 16' which is surrounded by and is rotatable relative to the inner race 14a' of the bearing 14'. The protuberance 16' extends into a centrally located recess 17' of the crankshaft 5'. The needle bearing 15' is mounted on the protuberance 16' close to the free end of the latter and is located in the recess 17' of the crankshaft 5'.

The flywheel 3' is a composite member which is assembled of several separately produced sections including a section or flange 18' and an annular rim 19' which is secured to the radially outermost portion of the flange 18' by rivets 19a'. The rim 19' carries a starter gear 20'. The flywheel 3' further includes a centrally located coupling section 21' which has a radially outwardly extending flange 22' secured to the flange 18' and to the crankshaft 5' by the aforementioned bolts 6' and a sleeve-like centering portion 25' which extends into the recess 17' of the crankshaft 5' and constitutes the outer race for the rolling elements of the needle bearing 15' while simultaneously centering the flywheel 3' on the crankshaft 5'. Another sleeve-like portion 23' of the coupling section 21' extends toward the flywheel 4' and surrounds the outer race 14b' of the antifriction bearing 14' on the protuberance 16'. The internal surface of the sleeve-like portion 23' has an annular groove 24' which non-rotatably receives the outer race 14b'.

The flywheel 4' is formed with apertures 4a' in register with the heads of the bolts 6' to facilitate the assembly or dismantling of the improved torque transmitting means. More specifically, the apertures 4a' render it possible to assemble the flywheels 3', 4' with the bearing system 13' and to thereupon attach the resulting unit to the end portion of the crankshaft 5'.

The assembly 1' further comprises a damper 26' which yieldably opposes angular movements of the flywheels 3' and 4' relative to each other. The damper 26' comprises circumferentially acting energy storing elements in the form of coil springs 27' (only one shown in each of FIGS. 3 and 4) and two friction generating devices 28', 29'. The flange 18' of the flywheel 3' constitutes the input component of the damper 26' and is flanked by two discs 30', 31' which are non-rotatably secured to each other and to the flywheel 4' by distancing elements 32' in the form of rivets. These distancing elements maintain the discs 30' and 31' at a fixed axial distance from one another. The flange 18' has windows 18a', one for each coil spring 27', and the discs 30', 31' are respectively formed with windows 30a', 31a', one for each window 18a'. Each coil spring 27' is received in one of the windows 18a' and in the corresponding windows 30a', 31a'. The flange 18' is further formed with arcuate slots 33' for the median portions of the distancing elements 32'. Such distancing elements cooperate with the end portions 33a', 33b' of surfaces bounding the respective arcuate slots 33' to limit the extent of angular movability of the flywheels 3' and 4' relative to each other.

The friction generating device 28' of the damper 26' is designed to oppose each and every angular movement of the flywheels 3' and 4' relative to each other. This device operates between the flange 18' of the flywheel 3' on the one hand and the discs 30', 31' on the flywheel 4' on the other hand. It comprises a resilient element 28a' which, in the embodiment of FIGS. 3 and 4, constitutes a diaphragm spring inserted in prestressed condition between the disc 31' and the flange 18' to react against the disc 31' and to bear against a washer 28b' of the friction generating device 28'. The washer 28b' bears against a friction generating ring 28c' which is in contact with the adjacent surface of the flange 18'.

The friction generating device 29' of the damper 26' is responsive to load and includes a disc-shaped element 34' in the space between the disc 30' and the flange 18'. The radially outermost portion of the element 34' has axially extending projections or arms 35' which extend through openings or cutouts 36' provided therefor in the flange 18'. As can be seen in FIG. 4, the dimensions of the openings 36' are selected in such a way that the element 34' and the flange 18' can turn relative to each other through a portion (37') of the maximum angular movement (39') of one of the flywheels 3', 4' relative to the other in the direction of arrow 46' as well as through a portion (38') of the maximum angular movement (40') of the flywheel 3' relative to the flywheel 4' or vice versa in the opposite direction (arrow 47'). The arrow 46' indicates the direction of rotation of the flywheels 3', 4' when the engine drives the wheels of the motor vehicle, and the arrow 47' indicates the direction of rotation when the motor vehicle is coasting.

The element 34' has an annular corrugation 41' which is adjacent to the arms 35' and is in frictional engagement with the disc 30'. The radially innermost portion 34a' of the element 34' has windows 42' for portions of the respective coil springs 27'. The length 43' of the windows 42' (as considered in the circumferential direction of the flange 18') is the same as the length of the windows 30a', 21a' in the discs 20', 21'. The length 44' of the windows 18a' exceeds the length 43' of the windows 30a, 31a' and 42'. The positioning of the windows 30a', 31a', 42' relative to the windows 18a' and the difference between the lengths 43' and 44' can be selected in such a way that the flange 18' can turn relative to the discs 30' and 31' through the angles 37' and 38' before the coil springs 27' which are installed between the flange 18' on the one hand and the discs 30', 31' on the other hand must store energy.

The friction generating device 29' of the damper 26' comprises a diaphragm spring 45' whose radially outermost portion bears against the arms 35' of the element 34' and whose radially innermost portion reacts against the disc 31'. The diaphragm spring 45' is installed in the space between the flange 18' and the disc 31' and serves the bias the element 34' against the disc 30'. The windows 30a', 31a' of the discs 30', 31', the windows 18a' of the flange 18' and the coil springs 27' are distributed (as considered in the circumferential direction of the flange 18') and dimensioned in such a way that the damper 26' offers a different resistance during different stages of angular movement of the flywheels 3' and 4' relative to each other. This will be explained in detail with reference to the diagram of FIG. 5. In other words, the characteristic curve of the damper 26' is a stepped curve because the opposition of the parts of the damper 26' changes with the extent of angular displacement of the flywheel 4' relative to the flywheel 3' and/or vice versa.

Figure 5:
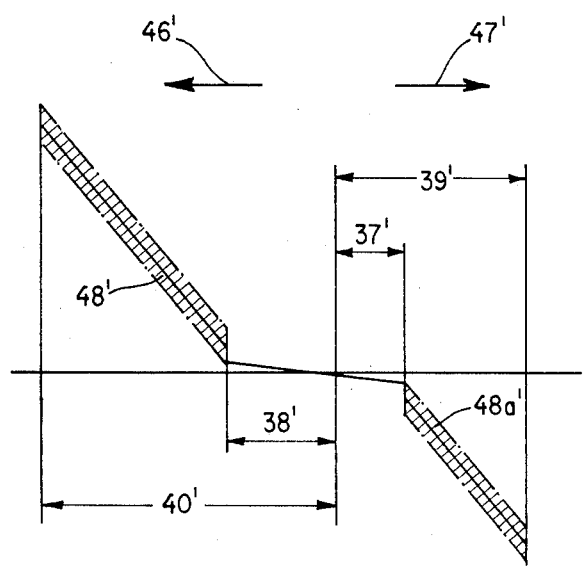
FIG. 5 is a graph showing the characteristic damping curve of the assembly which is shown in FIGS. 3 and 4.

In FIG. 5, the angular displacement of the flywheels 3' and 4' relative to each other is measured along the abscissa and the magnitude of the transmitted torque is measured along the ordinante. As mentioned above, the arrow 46' indicates the direction of rotation of the crankshaft 5', flywheels 3', 4' and input element 10' when the engine drives the wheels, and the arrow 47' indicates the direction of rotation when the vehicle is coasting. The solid-line curve denotes the damping action of the coil springs 27' and the hatched areas 48' and 48a' denote the superimposed frictional damping action of the device 29'.

FIG. 4 shows the parts of the damper 26' in the starting or ineffective positions. If one of the flywheels 3', 4' is rotated relative to the other flywheel in the direction of arrow 46', the weaker coil spring or springs 27" resist such angular movement of the one flywheel while the one flywheel turns through the angle 38'. This is the first or initial stage of operation of the damper 26'. When the one flywheel completes its angular movement relative to the other flywheel through the angle 38', further angular movement of the one flywheel is also opposed by the next set of coil springs 27' which offer a greater resistance to such angular movement. This set can include a single coil spring (such as the illustrated coil spring 27') or two or more coil springs. Thus, once the one flywheel has completed an angular movement through the angle 38', further rotation of such one flywheel relative to the other flywheel is opposed by the weakest coil spring or springs 27" as well as by the next-stronger coil spring or springs 27'. This is the second stage of operation of the damper 26'. At such time, the edge faces 49' in the windows 18a' of the flange 18' begin to bear against the next-stronger coil spring or springs 27' because the one flywheel has already completed an angular movement through the angle 38' in the direction of arrow 46'. The situation is analogous if the one flywheel turns in the direction of arrow 47'; the edge faces 50' in the windows 18a' of the flange 18' then begin to engage the next-stronger coil spring or springs 27' (including the illustrated spring 27') when the one flywheel completes an angular movement through the angle 37'.

The median portions of the distancing elements 32' and the portions 33a', 33b' of the surfaces bounding the end portions of the respective slots 33' determine the maximum extent of angular movability of the flywheels 3', 4' relative to each other. Thus, when the flywheel 3' completes a movement through the angle 40' in the direction of arrow 46', the median portions of the distancing elements 32' strike against the portions 33a' of the surfaces in the respective slots 33'. Inversely, when the flywheel 3' completes an angular movement through the angle 39' in the direction of arrow 47', the median portions of the distancing elements 32' strike against the portions 33b' of the surfaces in the corresponding slots 33'.

When the flywheel 3' is rotated relative to the flywheel 4' in the direction of arrow 46' or 47' from the position which is shown in FIG. 4, the friction generating device 28' of the damper 26' immediately opposes such angular movement of the flywheel 3'. The device 28' continues to constitute the sole means which frictionally opposes rotation of the flywheels relative to each other until the axially extending arms 35' of the element 34' between the flange 18' and the disc 30' reach the edge faces 51' or 52' of the surfaces bounding the respective openings 36' in the flange 18'. At such time, the parts 18', 34', 45' and 3' cannot rotate relative to each other so that, if one of the flywheels continues to turn relative to the other flywheel, the element 34' and the diaphragm spring 45' turn as a unit relative to the discs 30', 31' until the distancing elements 32' reach the end portions 33a' or 33b' of the surfaces bounding the respective arcuate slots 33'. The parts 34', 45' then generate a pronounced friction with the respective discs 30', 31' and such friction is denoted in FIG. 5 by the hatched areas 48' (rotation in the direction of arrow 46') and 48a' (rotation in the direction of arrow 47').

FIG. 5 further shows that the restoring force of coil springs 27' and 27", which cooperate with the friction generating device 29' (note the windows 42' in the element 34), suffices to return the parts of the assembly 1' to the neutral positions of FIG. 4. However, it is equally possible to select the stressing of the coil springs 27' and 27" in such a way that these springs are incapable of completely restoring the assembly 1' to its neutral position of FIG. 4. This results in a so-called shifting of the start of operation of the damper 26' and more specifically of the friction generating device 29'. Furthermore, it is possible to make the windows 42' of the element 34' longer than the windows 30a', 31a' of the discs 30', 31'; this also entails a certain shifting of the start of operation of the friction generating device 29'.

The curve of the diagram of FIG. 5 does not show the frictional damping action or frictional hysteresis of the friction generating device 28'. This is due to the fact that, in the embodiment of FIGS. 3 and 4, the damping action of the device 28' is assumed to be much weaker than that of the friction generating device 29'.

When the friction clutch 7' is engaged, the diaphragm spring 28a' of the first friction generating device 28' subjects the antifriction bearing 14' to an axial stress. In other words, the races 14a' and 14b' tend to move in opposite axial directions but are held against such axial movement by the rolling elements 14c' therebetween. When the clutch 7' is in the process of assuming a disengaged condition, the races 14a' and 14b' can move axially relative to each other to the extent which is determined by the play in the bearing 14' and against the opposition of the diaphragm spring 28a'. This entails a change in the locations of contact between the rolling elements 14c' and the tracks in the races 14a' and 14b'. Such changes are desirable and advantageous because they can entail a rolling of the rolling elements 14c' along the respective tracks, as considered in the circumferential direction of the bearing 14'. Consequently, the assembly 1' prevents excessive localized wear upon the rolling elements 14c' and/or upon the tracks of the races 14a', 14b' with the result that the useful life of the bearing 14' is much longer than the bearings in heretofore known torque transmitting assemblies.

In each of the embodiments which are respectively shown in FIGS. 1, 2 and 3-4, the antifriction bearings 15, 115 and 14' can be modified in such a way that the races of such bearings constitute integral parts of the respective flywheels, i.e., that the flywheels can be formed with suitable annular tracks for the rolling elements of the respective antifriction bearings.

Figure 6:
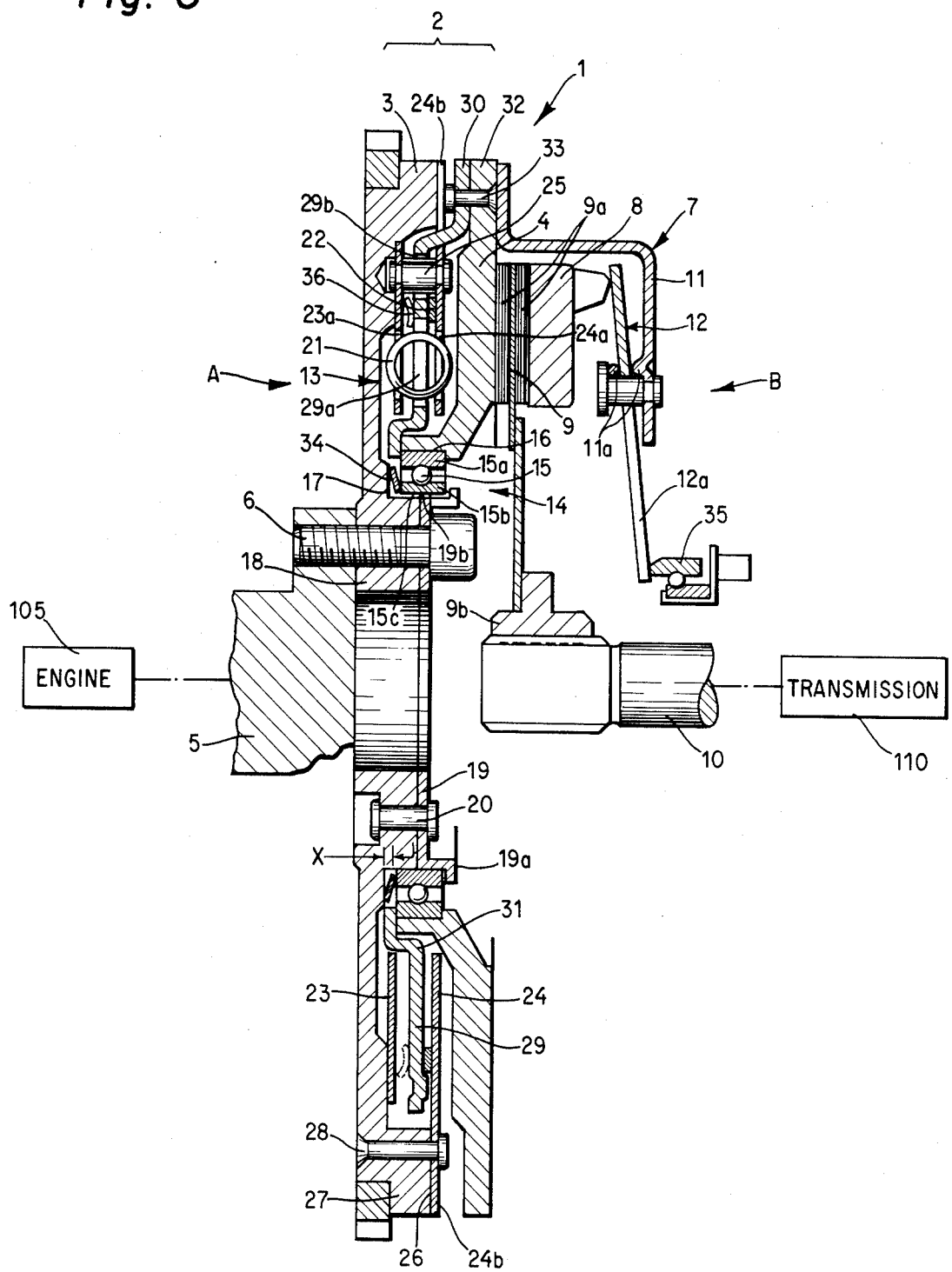
FIG. 6 is a fragmentary axial sectional view of a further torque transmitting assembly wherein the second unit embodies a push-type friction clutch which is shown in engaged condition.

The torque transmitting assembly 1 of FIG. 6 is identical with the assembly of FIG. 1 save for the provision of a biasing means in the form of a diaphragm spring 34 which reacts against the flywheel 3 and bears against the inner race 15b of the bearing 15.

The extent of axial movability of the inner race 15b relative to the protuberance 18 is determined by the radially outwardly extending shoulder 17 of the flywheel 3, by the radially outermost portion 19a of a sheet-metal retainer 19 which is affixed to the flywheel 3 by the rivets 20, and by the thickness of a diaphragm spring 34 which is installed in the space between the shoulder 17 and the inner race 17b and urges the latter in a direction to the right, as viewed in FIG. 6.

The friction generating washer 22 is installed between the disc 24 and the central portion 31 of the flange 29. This washer is pressed against the confronting surfaces of the parts 24 and 31 (which can be said to constitute portions of the flywheels 3 and 4) when the friction clutch 7 is engaged, i.e., when the diaphragm spring 34 is free to urge the inner race 15b of the antifriction bearing 15 in a direction to the right whereby the rolling elements 15c between the races 15a and 15b urge the race 15a and the entire flywheel 4 in a direction to the right with the result that the flange 29 is pulled in the same direction to bear against the washer 22 which is thereby urged against the left-hand side or surface of the disc 24. The diaphragm spring 34 reacts against the shoulder 17 of the flywheel 3 and thus serves as a resilient means for yieldably biasing the flywheel 4 axially in a direction away from the flywheel 3 to the extent which is permitted by the disc 24 on the flywheel 3. At the same time, the diaphragm spring 34 opposes rotation of the race 15b relative to the flywheel 3. The small clearance between the right-hand end face of the inner race 15b and the radially outermost portion 19a of the retainer 19 allows for a certain amount of wear upon the washer 22 and/or diaphragm spring 34. It can be said that the diaphragm spring 34 urges the flywheel 4 axially and away from the crankshaft 5 or that the spring 34 urges the flywheel 3 in a direction to the left and away from the flywheel 4. The aforementioned key 19b which extends into the axially parallel groove 15c of the inner race 15b of the bearing 15 is a radially inwardly extending projection of the retainer 19. It is also possible to provide such a key directly on the protuberance 18 of the flywheel 3 or to provide a removable key which is shiftable relative to the protuberance 18 and retainer 19 but is partially confined in one of these parts so that it extends into the groove 15c.

The axial length of the diaphragm spring 34 can be reduced to a certain extent (note the distance X) when the flywheel 4 is urged axially with a force which suffices to overcome the resistance of and to thereby flatten the spring 34 against the shoulder 17 of the protuberance 18 on the flywheel 3. The distance X matches or approximates the distance through which fthe flywheel 4 is movable axially relative to the flywheel 3 in response to operation of the actuating means 35 which is operable in the customary way to effect a change in the condition of the friction clutch 7, namely a change from the engaged to the disengaged condition or vice versa. The arrangement is such that the flywheel 4 is caused to move axially through the distance X and in a direction toward the flywheel 3 in response to disengagement of the friction clutch 7. Depending on the intended use of the improved torque transmitting assembly 1, the distance X will be somewhere between 0.1 and 2 mm. The magnitude of friction which is generated by the washer 22 depends upon the characteristics and initial stressing of the diaphragm spring 34 and/or the diaphragm spring 36 which (when provided) is installed between the disc 23 and the central portion 31 of the flange 29.

The operation of the torque transmitting assembly 1 of FIG. 6 is as follows:

The parts of the assembly 1 are assumed to be in the positions which are shown in FIG. 1, i.e., the friction clutch 7 is engaged and thus ensures that, when the engine 105 is one, the crankshaft 5 drives the flywheel 3 which drives the flywheel 4 through the medium of the damper 13 so that the flywheel 4 drives the clutch disc 9 which, in turn, drives the input element 10 of the change-speed transmission 110. The washer 22 generates a maximum amount of friction which opposes changes in the angular positions of the flywheels 3 and 4 relative to each other. If the operator wishes to disengage the clutch 7, i.e., to interrupt the power train between the engine 105 and the transmission 110, the actuating bearing 35 is shifted in a direction to the left, as viewed in FIG. 1, to depress the tips of the prongs 12a forming part of the diaphragm spring 12. The diaphragm spring 12 is caused to tilt between the seats 11a on the cover 11 and acts upon the left-hand seat 11a in a sense to urge the cover 11 as well as the flywheel 4 in a direction to the left against the opposition of the diaphragm spring 34 which tends to maintain the flywheel 4 at a maximum distance from the flywheel 3. Thus, the (indirect) bias of the diaphragm spring 34 upon the washer 22 is relaxed and the friction which is generated by this washer also decreases. When the actuating bearing 35 has shifted the tips of the prongs 12a to the extent which is required to enable the diaphragm spring 12 of the friction clutch 7 to overcome the resistance of the diaphragm spring 34, the axial length of the latter is reduced, i.e., the spring 34 moves progressively into a plane which is normal to the common axis of the flywheels 3 and 4 and the flywheel 4 gradually approaches the flywheel 3. The flywheel 4 ultimately assumes its left-hand end position at the distance X to the left of the position which is shown in FIG. 6. The washer 22 is assumed to be affixed to the flange 29 and to be in frictional engagement with the disc 24, at least in the illustrated position of the diaphragm spring 34. When the diaphragm spring 34 lies flat against the shoulder 17 of the flywheel 3, the friction between the washer 22 and the disc 24 (i.e., between the flywheels 3 and 4) is reduced to zero. The anti-friction bearing 15 moves axially with the flywheel 4, i.e., the inner race 15b of this bearing moves nearer to the shoulder 17 and hence further away from the radially outermost portion 19a of the retainer 19. It will be noted that the bearing 15 must take up the force which is required to disengage the friction clutch 7.

In order to reengage the clutch 7, the bearing 35 is moved in a direction to the right, as viewed in FIG. 6, and back toward the illustrated position. This entails a tilting of the diaphragm spring 12 between the seats 11a of the cover 11 due to innate resiliency of this diaphragm spring whereby the pressure plate 8 moves in a direction to the left, as viewed in FIG. 6, and urges the left-hand lining 9a against the flywheel 4. The clutch disc 9 is gradually clamped between the parts 4 and 8 and begins to transmit torque to the input element 10 of the change-speed transmission 110. When the magnitude of the force acting upon the tips of the prongs 12a drops below the force which is stored by the fully deformed diaphragm spring 34, the latter is free to gradually assume the shape which is shown in FIG. 6 and thereby pushes the flywheel 4 and the bearing 15 axially and away from the flywheel 3 through the distance X at which time the washer 22 is again in full frictional engagement with the disc 24.

If desired or necessary, the damper 13 can further comprise means for generating friction between the flywheels 3 and 4 in each and every axial position of the flywheel 4 relative to the flywheel 3, i.e., also at such times when the friction clutch 7 is disengaged as a result of movement of the actuating bearing 35 to its left-hand end position. Such friction generating means is optional and can constitute a second diaphragm spring, namely the aforementioned diaphragm spring 36 which is installed between the disc 23 and the central portion 31 of the flange 29. The means (not specifically shown) for holding the diaphragm spring 36 against rotation relative to the disc 23 can comprise one or more axially extending prongs which are received in complementary openings of the disc 23. In the embodiment of FIG. 6, the radially outermost portion of the diaphragm spring 36 reacts against the disc 23 and the radially innermost portion of this spring bears against the adjacent portion of the left-hand side or surface of the flange 29. If desired, the diaphragm spring 36 can be mounted and configured in such a way that its bias upon the flange 29 (i.e., upon the flywheel 4) varies in response to engagement or disengagement of the friction clutch 7 i.e., in response to axial movement of the flywheel 4 relative to the flywheel 3. Since the diaphragm spring 36 also serves as a means for biasing the flywheel 4 axially and relative to the flywheel 3, it can be used in lieu of the diaphragm spring 34.

Figure 7:
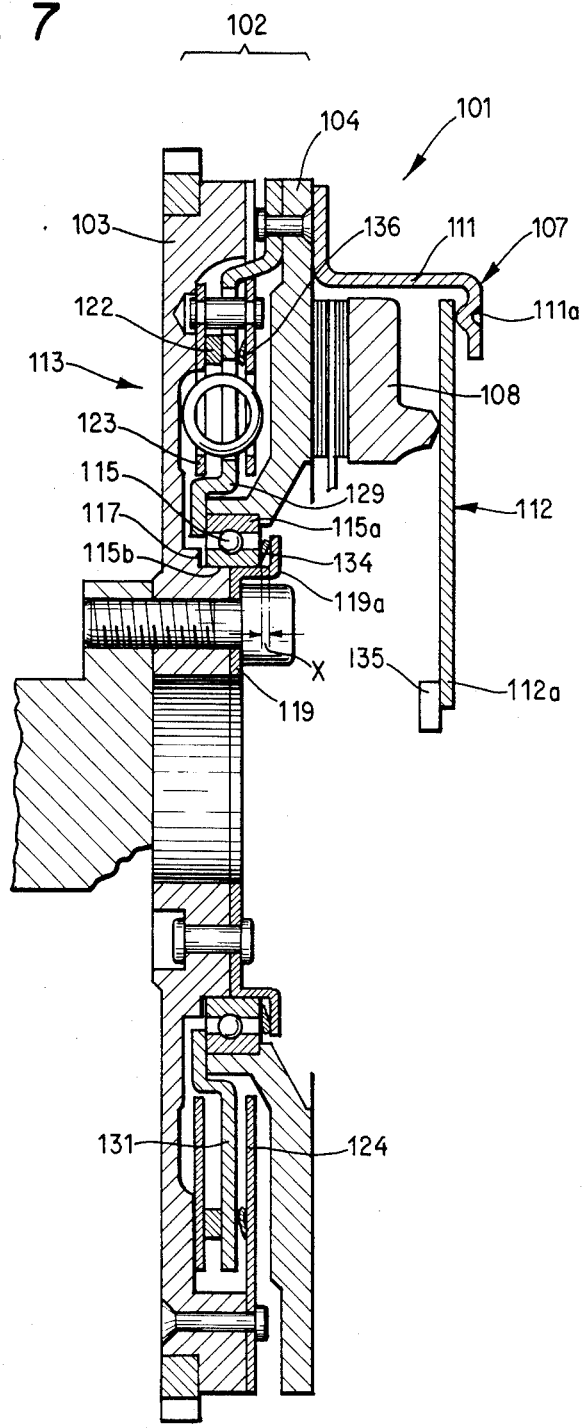
FIG. 7 is a similar fragmentary axial sectional view of an additional torque transmitting assembly with a pull-type friction clutch.

FIG. 7 shows a portion of a modified torque transmitting assembly 101 wherein all such parts which are identical with or clearly analogous to the corresponding parts of the assembly 101 of FIG. 2 are denoted by similar reference characters. One of the differences between the assembly 1 of FIG. 6 and the assembly 101 of FIG. 7 is that the latter employs the pull-type friction clutch 107 wherein the inner end portions or tips of prongs 112a on the diaphragm spring 112 must be pulled in a direction to the right in order to disengage the clutch. The clutch actuating means 135 for pulling the prongs 112a can include one race of a suitable bearing. The washer-like friction generating element 122 of the damper 113 is installed between the central portion 131 of the flange 129 and the left-hand disc 123 of the input component of the damper. The diaphragm spring 134 reacts against the radially outermost portion 119a of the retainer 119 and bears against the inner race 115b of the antifriction bearing 115 so that the entire bearing is urged in a direction to the left, i.e., with the flywheel 104 and toward the flywheel 103. The washer 122 is affixed to the flange 129 and is biased against the disc 123 when the friction clutch 107 is engaged, i.e., when the diaphragm spring 112 is free to urge the pressure plate 108 in a direction toward the flywheel 104. The clearance which is provided between the radially extending shoulder 117 of the flywheel 103 and the left-hand end face of the inner race 115b of the bearing 115 ensures that the washer 122 remains in adequate frictional engagement with the disc 123 even if it (and/or the diaphragm spring 134) undergoes a certain amount of wear. Thus, when the washer 122 undergoes wear, the spring 134 simply moves the flywheel 104 nearer to the flywheel 103 while the washer 122 remains in frictional engagement with the disc 123 as long as the friction clutch 107 remains engaged.

When the force which the diaphragm spring 134 exerts upon the inner race 115b of the bearing 115 is overcome, the axial length of the spring 134 is reduced by the distance X which allows the washer 122 to move away from the disc 123 so that the frictional engagement between these parts is reduced, normally to zero.

The assembly 101 of FIG. 7 can also comprise the diaphragm spring 136 which is non-rotatably mounted on and reacts against the disc 124 and bears against the central portion 131 of the flange 129 to urge the flywheel 104 in a direction toward the flywheel 103. The spring 136 generates friction irrespective of the condition of the friction clutch 107 but it can be constructed and mounted in such a way that its bias upon the flange 129 varies in response to axial movement of the flywheel 104 relative to the flywheel 103. The spring 136 can be used in addition to or in lieu of the spring 134.

The operation of the assembly 101 of FIG. 7 is as follows:

FIG. 7 shows the friction clutch 107 in engaged condition. Therefore, the diaphragm spring 134 is free to urge the washer 122 against the disc 123 with a maximum force so that this washer strongly resists any angular movements of the flywheel 103 relative to the flywheel 104 and/or vice versa. If the actuating bearing 135 is thereupon moved in a direction to the right so as to move the tips of the prongs 112a in the same direction, the diaphragm spring 112 is tilted relative to its seat 111a on the cover or housing 111 and urges the cover 111 and hence the flywheel 104 in a direction to the right, i.e., away from the flywheel 103. The bias upon the washer 122 of the diaphragm spring 134 decreases so that the friction between the washer 122 and the disc 123 also decreases. At a certain stage of movement of the prongs 112a to the right, as viewed in FIG. 2, the force of the diaphragm spring 134 is overcome so that the axial length of this spring decreases by the distance X which enables the flywheel 104 to move away from the flywheel 103 through the same distance and to effect complete disengagement of the washer 122 from the disc 123.

When the actuating bearing 135 is operated to move in a direction to the left, i.e., back to the starting position of FIG. 7, the force with which the diaphragm spring 112 pulls the cover 111 and the flywheel 104 in a direction to the right decreases so that the diaphragm spring 134 is ultimately free to shift the inner race 115b of the bearing 115 back to the position of FIG. 2 with attendant reduction of the distance between the flywheels 103 and 104 by the value of X whereby the washer 122 again bears against the disc 123 with a maximum force to oppose angular movements of the flywheels 103, 104 relative to each other.

It is clear that, by properly relating the forces of the springs 34, 36 or 134, 136 (which determine the timing of axial movement of the flywheel 4 or 104 relative to the flywheel 3 or 103) to the force which is applied to the actuating means 35 or 135, one can influence the exact rate at which the friction (generated by the washer 22 or 122) decreases and increases during disengagement and engagement of the clutch 7 or 107. In fact, it is even possible (and actually desirable in certain types of motor vehicles) to select the initial stressing of the diaphragm spring 34 or 134 in such a way that the latter successfully resists complete or pronounced flattening (through the entire distance X) in response to disengagement of the friction clutch 7 or 107, i.e., that the bias of the spring 34 or 134 varies (to vary the friction between the washer 22 or 122 and the disc 24 or 123) but the washer 22 or 122 continues to generate at least some friction between the flywheels 3, 4 or 103, 104 in the course of the entire disengaging operation. In other words, the initial stressing of the spring 34 and/or 134 can be selected in such a way that it exceeds the maximum force which is required to move the tips of the prongs 12a and/or 112a through distances which are necessary to effect a disengagement of the respective friction clutch 7 and/or 107.

An important advantage of the assemblies of FIGS. 6 and 7 is that they can readily conform to the requirements in a particular motor vehicle. Thus, each such assembly can employ a push-type or a pull-type friction clutch, the axially movable flywheel can move toward or away from the other flywheel in response to disengagement of the clutch, friction between the two flywheels can but need not be reduced to zero in response to disengagement of the clutch, the diaphragm spring 34 or 134 can perform several functions (including urging the flywheel 4 or 104 axially of the other flywheel 3 or 103, exerting pressure upon the washer 22 or 122 and opposing rotation of the race 15b or 115b relative to the corresponding flywheel 3 or 103), and the axial movability of one of the flywheels relative to the other flywheel does not interfere with proper operation of the damper 13 or 113. On the contrary, the operation of the damper is enhanced, at least during engagement or disengagement of the friction clutch. All this renders it possible to select for the assembly 1 or 101 an optimum characteristic damping curve which is best suited for a particular power train between the internal combustion engine and the change-speed transmission to a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of the equivalence of the appended claims.

We claim:

1. A torque transmitting and torsion damping assembly, particularly for the transmission of torque between an internal combustion engine and an input element of a change-speed transmission in a motor vehicle, comprising a first rotary unit normally receiving torque from the engine and a second rotary unit coaxial with said first unit and arranged to normally transmit torque to the transmission, said first and second units respectively comprising first and second flywheels and said second unit further comprising a clutch interposed between said second flywheel and the transmission; actuating means operable to change the condition of said clutch between an engaged condition in which said clutch transmits torque between said second flywheel and the transmission and a disengaged condition; antifriction bearing means interposed between said flywheels, at least one of said flywheels being movable within predetermined limits axially relative to the other of said flywheels, said flywheels being angular movable relative to each other and said bearing means including first and second races respectively rotatable with said first and second flywheels and rolling elements between said races; damper means disposed between said units to yieldably oppose angular movements of said flywheels relative to each other; and resilient means including a resilient element which reacts axially against one of said units and bears axially against the other of said units so as to act against axial movements of said races relative to each other in one direction in engaged condition of said clutch by urging said races axially against said rolling elements.

2. The assembly of claim 1, wherein said resilient means is arranged to yieldably resist axial movements of said second flywheel in response to operation of said actuating means to disengage said clutch.

3. The assembly of claim 1, wherein the operation of said actuating means involves the application of a predetermined force and the force with which said resilient means yieldably resists axial movements of said one flywheel is smaller than said predetermined force.

4. The assembly of claim 1, wherein said one flywheel is arranged to move axially toward said other flywheel in response to operation of said actuating means to disengage said clutch.

5. The assembly of claim 4, wherein said clutch is a push-type clutch.

6. The assembly of claim 1, wherein said one flywheel is arranged to move axially away from said other flywheel in response to operation of said actuating means to disengage said clutch.

7. The assembly of claim 1, wherein said resilient means includes means for biasing said one flywheel axially toward said other flywheel.

8. The assembly of claim 1, wherein said resilient means includes means for biasing said one flywheel axially and away from said other flywheel.

9. The assembly of claim 1, further comprising means for limiting the extent of axial movement of said one flywheel relative to said other flywheel.

10. The assembly of claim 1, wherein one of said races is installed in and is held against axial movement relative to the respective flywheel, the other of said races being axially movably mounted on the respective flywheel.

11. The assembly of claim 10, wherein said first flywheel comprises a centrally located protuberance and said second race is axially movably mounted on said protuberance.

12. The assembly of claim 1, wherein said bearing means comprises a ball bearing.

13. The assembly of claim 1, wherein said bearing means comprises a bearing with single annulus of antifriction rolling elements.

14. The assembly of claim 1, wherein said resilient element is provided in addition to said damper means.

15. A torque transmitting and torsion damping assembly, particularly for the transmission of torque between an internal combustion engine and an input element of a change-speed transmission in a motor vehicle, comprising a first rotary unit normally receiving torque from the engine and a second rotary unit coaxial with said first unit and arranged to normally transmit torque to the transmission, said first and second units respectively comprising first and second flywheels and said second unit further comprising a clutch interposed between said second flywheel and the transmission, at least one of said flywheels being movable within predetermined limits axially relative to the other of said flywheels and said flywheels being angularly movable relative to each other; antifriction bearing means interposed between said flywheels; damper means interposed between said units to yieldably oppose angular movements of said flywheels relative to each other; actuating means operable to change the condition of said clutch between an engaged condition in which the clutch transmits torque between said second flywheel and the transmission and a disengaged condition, said one flywheel being arranged to move axially relative to said other flywheel in response to operation of said actuating means; and resilient means for biasing said flywheels axially relative to each other, said resilient means including a resilient element which reacts against one of said units and bears against the other of said units.

16. The assembly of claim 15, wherein said flywheels are substantially disc-shaped and said one flywheel is arranged to respectively move axially toward and away from said other flywheel in response to disengagement and engagement of said clutch.

17. The assembly of claim 15, wherein said one flywheel is arranged to respectively move axially away from and toward said other flywheel in response to disengagement and engagement of said clutch.

18. The assembly of claim 15, wherein said clutch is a push-type clutch.

19. The assembly of claim 15, said resilient means comprising means for biasing said one flywheel axially toward said other flywheel.

20. The assembly of claim 15, said resilient means comprising means for biasing said one flywheel axially and away from said other flywheel.

21. The assembly of claim 15, further comprising means for limiting the extent of axial movability of said one flywheel relative to said other flywheel.

22. The assembly of claim 15, wherein said damper means comprises at least one friction generating element which is interposed between said flywheels and is arranged to generate friction whose magnitude varies im response to operation of said actuating means.

23. The assembly of claim 22, wherein the magnitude of friction which is generated by said friction generating element is variable in response to axial movement of said one flywheel relative to said other flywheel.

24. The assembly of claim 22, wherein the magnitude of friction which is generated by said friction generating element is reduced in response to operation of said actuating means to disengage said friction clutch.

25. The assembly of claim 22, wherein the friction which is generated by said friction generating element is reduced to zero in response to operation of said actuating means to disengage said clutch.

26. The assembly of claim 22, wherein said friction generating element is interposed between said flywheels.

27. The assembly of claim 26, wherein said flywheels include discs having confronting surfaces and said friction generating element is interposed between said surfaces.

28. The assembly of claim 22, wherein said friction generating element comprises at least one washer.

29. The assembly of claim 22, said resilient means comprising means for biasing said one flywheel axially of said other flywheel in the engaged condition of said clutch, said biasing means including means for urging said friction generating element into engagement with said flywheels in the engaged condition of said clutch.

30. The assembly of claim 29, wherein said urging means is inoperative in the disengaged condition of said clutch.

31. The assembly of claim 29, wherein said one flywheel is arranged to reduce the bias of said biasing means upon said friction generating element in response to axial movement of said one flywheel relative to said other flywheel as a result of the operation of said actuating means to disengage said clutch.

32. The assembly of claim 15, wherein said bearing means comprises a first race which is mounted in said one flywheel for axial movement therewith and a second race which is mounted in and is movable axially of said other flywheel.

33. The assembly of claim 32, wherein said first race is mounted in said second flywheel.

34. The assembly of claim 32, said resilient means comprising means for biasing said one flywheel axially relative to said other flywheel through the medium of said second race.

35. The assembly of claim 34, wherein said biasing means includes means for opposing rotation of said second race with reference to said other flywheel.

36. The assembly of claim 15, wherein said damper means comprises energy storing resilient means acting in the circumferential direction of said flywheels.

37. The assembly of claim 15, wherein said damper means comprises friction generating means interposed between said units.

38. The assembly of claim 37, wherein said damper means further comprises second friction generating means which is interposed between said flywheels and is arranged to generate friction whose magnitude is variable in response to the operation of said actuating means.

39. A torque transmitting and torsion damping assembly, particularly for the transmission of torque between an internal combustion engine and an input element of a change-speed transmission in a motor vehicle, comprising a first rotary unit normally receiving torque from the engine and a second rotary unit coaxial with said first unit and arranged to normally transmit torque to the transmission, said first and second units respectively comprising first and second flywheels and said second unit further comprising a clutch interposed between said second flywheel and the transmission; actuating means operable to change the condition of said clutch between an engaged condition in which said clutch transmits torque between said second flywheel and the transmission and a disengaged condition, the operation of said actuating means involving the application of a predetermined force in a predetermined direction; antifriction bearing means interposed between said flywheels, said flywheels being angularly movable relative to each other; damper means disposed between said units to yieldably oppose angular movements of said flywheels relative to each other; and resilient means acting axially upon said second flywheel counter to the direction of application of said force during disengagement of said clutch, said resilient means comprising at least one diaphragm spring.

40. The assembly of claim 39, wherein said bearing means includes first and second races respectively rotatable with said first and second flywheels, said resilient means reacting against one of said units and bearing against the other of said units so as to resist axial movements of said races relative to each other in one direction in the engaged condition of said clutch.

41. A torque transmitting and torsion damping assembly, particularly for the transmission of torque between an internal combustion engine and an input element of a change-speed transmission in a motor vehicle, comprising a first rotary unit normally receiving torque from the engine and a second rotary unit coaxial with said first unit and arranged to normally transmit torque to the transmission, said first and second units respectively comprising first and second flywheels and said second unit further comprising a push-type clutch interposed between said second flywheel and the transmission; actuating means operable to change the condition of said clutch between an engaged condition in which said clutch transmits torque between said second flywheel and the transmission and a disengaged condition, one of said flywheels being arranged to move axially away from the other of said flywheels in response to operation of said actuating means to disengage said clutch; antifriction bearing means interposed between said flywheels, said flywheels being angularly movable relative to each other and said bearing means including first and second races respectively rotatable with said first and second flywheels; damper means disposed between said units to yieldably oppose angular movements of said flywheels relative to each other; and resilient means including a resilient element which reacts against one of said units and bears against the other of said units so as to act against axial movements of said races relative to each other in one direction in engaged condition of said clutch.

42. A torque transmitting and torsion damping assembly, particularly for the transmission of torque between an internal combustion engine and a input element of a change-speed transmission in a motor vehicle, comprising a first rotary unit normally receiving torque from the engine and a second rotary unit coaxial with the first unit and arranged to normally transmit torque to the transmission, said first and second units respectively comprising first and second flywheels and said second unit further comprising a pull-type clutch interposed between said second flywheel and the transmission, at least one of said flywheels being movable within predetermined limits axially relative to the other of said flywheels and said flywheels being angularly movable relative to each other; antifriction bearing means interposed between said flywheels; damper means interposed between said units to yieldably oppose angular movements of said flywheels relative to each other; actuating means operable to change the condition of said clutch between an engaged condition in which the clutch transmits torque between said second flywheel and the transmission and a disengaged condition, said one flywheel being arranged to move axially relative to said other flywheel in response to operation of said actuating means; and resilient means for biasing said flywheels axially relative to each other.

43. A torque transmitting and torsion damping assembly, particularly for the transmission of torque between an internal combustion engine and an input element of a change-speed transmission in a motor vehicle, comprising a first rotary unit normally receiving torque from the engine and a second rotary unit coaxial with the first unit and arranged to normally transmit torque to the transmission, said first and second units respectively comprising first and second flywheels and said second unit further comprising a clutch interposed between said second flywheel and the transmission, at least one of said flywheels being movable within predetermined limits axially relative to the other of said flywheels and said flywheels being angularly movable relative to each other; antifriction bearing means interposed between said flywheels; damper means interposed between said units to yieldably oppose angular movements of said flywheels relative to each other; actuating means operable to change the condition of said clutch between an engaged condition in which the clutch transmits torque between said second flywheel and the transmission and a disengaged condition, said one flywheel being arranged to move axially relative to said other flywheel in response to operation of said actuating means; and a diaphragm spring for biasing said flywheels axially relative to each other.

* * * * *